UNITED STATES PATENT OFFICE 2,584,351

CONDENSATION OF AN ORGANO SILANE WITH A POLYHYDRIC ALCOHOL AND THEREAFTER WITH A POLYCARBOXYLIC ACID AND PRODUCT

Melvin J. Hunter and Lawrence A. Rauner, Midland, Mich., assignors to Dow Corning Corporation, Midland, Mich., a corporation of Michigan No Drawing. Application November 10, 1948, Serial No. 59,414

8 Claims. (Cl. 260—45.4)

This invention relates to copolymeric organosilicon materials and to their method of preparation.

The advent of organo-polysiloxane resins represents an important contribution to the advancement of the polymer art. Such materials possess thermal stability, chemical inertness and oxidation resistance to a degree far beyond that of organic resins. On the other hand, many organic resins have stress-strain properties which are superior to the polysiloxanes. It is desirable, therefore, to produce a material which combines the best features of both types of resins.

In the past, efforts to solve this problem have taken two directions. One is that of mixing polysiloxanes with organic resins. This method is generally unsatisfactory due to the incompatibility of the two types of materials. The other method is that of heating organo-silicols with organic resins. Such a method is disclosed in British Patent 583,754 wherein a partially condensed organic silicol is heated with an alkyd resin. In this method two reactions will occur simultaneously. Some of the hydroxyl groups on the silicon will condense with each other to produce siloxane linkages and some of the silicon hydroxyls will condense with the terminal functional groups on the alkyd resin chain to produce carbon-oxygen-silicon linkages. In effect therefore, this is a method of tying polysiloxane chains on to the end of alkyd resin chains. Thus, the organo silicon groups will be present in the finished product as aggregates rather than being dispersed in the alkyd chain.

It is an object of this invention to prepare resinous materials which combine the desirable properties of both organo-polysiloxanes and organic resins. Another object is to prepare resins which are cheaper than organo-polysiloxane resins. Other objects and advantages will be apparent from the following description.

In accordance with this invention an organo silane is condensed with a polyhydric alcohol and the condensation product thereof is then reacted with a polycarboxylic acid or its anhydride. The silanes are of the type $R_nSiX_{4-n}$ where $n$ has a value from 0.9 to 2.1, R is methyl or phenyl and X is halogen or alkoxy. The polyhydric alcohol contains from 3 to 4 hydroxyl radicals and the silane and alcohol are condensed in such amount that the ratio of silane X radicals to alcohol hydroxyl radicals is between 0.33 and 0.88. The condensation product thereby obtained is reacted with a polycarboxylic acid having from 2 to 3 carboxyl groups per molecule, or the anhydride thereof, in amount such that the ratio of the number of acid functional groups to the sum of the number of alcoholic hydroxyl radicals plus the silane X radicals is from 0.06 to 1.2.

In this application the term functional groups means the reactive radicals. Thus, the silane functional groups are the halogen and alkoxy radicals. The acid functional groups are carboxyl radicals and anhydride groups. Each anhydride group is equivalent to two carboxyl radicals.

The silanes used in this invention are selected from the group methyl and phenyl halosilanes and methyl and phenyl alkoxysilanes. Such compounds include, for example, phenylmethyldichlorosilane, phenylmethyldiethoxysilane, phenyltrichlorosilane, diphenyldichlorosilane, monophenyltrichlorosilane and dimethyldichlorosilane. These compounds may be employed either alone or in combination. In addition, limited amounts of unsubstituted silanes such as tetraethoxysilane and silicon tetrachloride or tri-substituted silanes of the type $R_3SiX$ may be included in the silane mixture. Whether the silane is a pure compound or a mixture, it is preferred that there be between 0.9 and 2.1 hydrocarbon radicals per silicon atom. Other organosilanes may be employed such as those which contain other monovalent hydrocarbon radicals in place of the methyl or phenyl radicals, as for example higher alkyl radicals such as octadecyl or other monocyclic aryl radicals such as tolyl and xylyl.

The organo-silanes are known in the art and may be prepared by any appropriate method.

The silane is condensed with a polyhydric alcohol in which there are from 2 to 4 hydroxyl groups per molecule. Aliphatic alcohols, such as glycerin, glycols and 2,2-bishydroxymethyl-1,3 propanediol, are examples of polyhydric alcohols which may be employed.

The condensation of the alcohol and the silane is effected by bringing the two in contact, whereupon the functional groups of the silane and the hydroxyl groups of the alcohol react to produce organo silyl polyesters with the concurrent splitting out of a halogen acid or a monohydroxy alcohol. Condensation between silanes and the polyhydric alcohol takes place at temperatures ranging from below 0° C. to above 300° C. When alkoxy silanes are employed it is sometimes advisable to add traces of a strong acid as HCl or $H_2SO_4$ to the reaction mixture in order to hasten the condensation reaction. Usually the condensation is continued until substantially the theoretical amount of the by-product has been removed from the reaction mixture thereby indicating that all the silane functional groups have reacted with the alcohol.

The silane and the alcohol are condensed in such amount that the ratio of silane functional groups to alcoholic hydroxyl groups is between 0.33 and 0.88. Thus, there is always an excess of hydroxyl groups which are free to react with the polycarboxylic acid.

The condensation product obtained as shown above is reacted with a polycarboxylic acid or its anhydride. In either case the reaction proceeds smoothly with the formation of ester linkages and the elimination of water, to produce three component copolymers. The reaction is preferably carried out at temperatures above 100° C. The amount of acid employed may vary from that which will leave 15 percent of the alcoholic hydroxyls unreacted to that which will leave a 15 percent excess of carboxyl groups over the number of hydroxyl groups in the alcohol employed. In many cases it is desirable to use stoichiometric amounts of all the reactants.

The copolymeric materials of this invention vary in properties depending upon the amount and type of ingredients employed therein. When all three components are difunctional, the final product is a soluble thermoplastic resin.

Thermosetting resins are obtained when at least one of the components is at least trifunctional. The trifunctionality may reside in either the silane, the alcohol or the acid or any combination thereof. The resins are thermoset by continuing the polymerization until the material becomes infusible and insoluble in benzene.

In certain commercial applications of these materials it is desirable to stop the polymerization at a point short of thermosetting. This can be done by continuing the reaction after addition of the acid, until the reaction mixture has reached the desired viscosity and thereupon cooling the mass and dissolving it in a solvent. Suitable solvents include aromatic hydrocarbons, aliphatic hydrocarbons, ethers, ketones or combinations thereof. The resulting solutions have a long shelf life and may therefore be stored without precipitation of the resin. These solutions can be employed to impregnate and coat base materials and the solvent is then removed and the resin coat cured in place by heating.

The copolymers of this invention possess to a high degree the desirable properties of both organic resins and polysiloxane resins. Like organic resins, such as phenol-formaldehyde and alkyds they set to hard materials which show little tendency to soften at elevated temperatures and are highly resistant to hot solvents. At the same time, they possess a degree of thermal stability and oxidation resistance approaching that of polysiloxane resins. Whereas organic resins such as alkyds and mixtures of alkyds and polysiloxanes darken rapidly at 250° C., the copolymeric materials of this invention remain clear after several days at that temperature.

Because of the above combination of properties the present materials are eminently adaptable for coating electrical conductors and for use as paint vehicles. A smoke stack was coated with a paint prepared by mixing a resin of this invention with a pigment. The coat shows no sign of deterioration after 16 months at temperatures between 300° F. and 340° F. In addition the thermosetting resins have the requisite stress-strain and solvent-resistant properties necessary for good wire enamel for electrical insulation.

The resins of this invention may be modified by including therein other additives. The modifiers may be reacted with either the alcohol, the silane or the acid before they are introduced into the system or the modifiers may be added along with any one of the three components or combinations thereof or the modifiers may be introduced after the alcohol, the silane and the acid have been copolymerized.

Modifiers include fatty acids, such as stearic, linoleic; hydroxyl containing oils such as a hydrogenated castor oil which contains three hydroxyl groups per molecule; organic resins such as alkyd, modified alkyd and polyvinyl acetate; and phenols such as catechol, resorcinol or hydroquinone.

The resins of this invention have excellent compatibility with organic resins such as polyvinyl acetate, urea-formaldehyde and aryl sulphonamide-formaldehyde.

Polyesters formed by the condensation of silanes with polyhydric alcohols may be incorporated in a wide variety of resins. The polyester may be combined with an additional amount of the same polyhydric alcohol or with different polyhydric alcohols and the resulting material reacted with a polybasic acid. Polyfunctional acids which may be employed include polycarboxylic acids, amino acids, sulphonic acids, hydroxy acids and the like. It is to be understood that the silane-polyhydric alcohol condensation products of this invention may be incorporated in a system containing such polyfunctional acids at any stage during the polymerization of that system.

In order that those skilled in the art may better understand this invention, recourse may be had to the following examples which should be considered as illustrative only. In the examples statements of "mols" employed has reference to gram mols.

EXAMPLES

*Example 1*

A mixture of 7.2 mols of phenylmethyldiethoxysilane and 0.8 mols of phenyltriethoxysilane was added rapidly with agitation to 8.35 mols of USP glycerin. Ten grams of concentrated HCl was added and the mixture was heated and agitated. By the time the mixture began to reflux, at a temperature of 93° C., the system was a clear, homogeneous mass. The temperature was gradually raised to 200° C. during which time substantially the theoretical amount of ethyl alcohol distilled from the system. The mixture was cooled to 120° C. and 3.7 mols of phthalic anhydride was added. The temperature was raised gradually to 200° C. with stirring, during which time a stream of carbon dioxide was passed through the flask to aid in the removal of water. Heating at 200° C. was continued until the mixture began to foam, whereupon 500 cc. of xylene was added and heating was continued until the viscosity of the resin became so high that stirring was impractical. The resulting resin was a viscous clear material which was soluble in xylene and methyl ethyl ketone.

A metal panel was coated with the resin and heated at 250° C. whereupon the resin set to a hard, solvent-resistant material which did not decompose after several days at that temperature.

Example 2

A resin was prepared from two mols of phenylmethyldiethoxysilane, two mols of glycerin and one mol of phthalic anhydride by the procedure of Example 1. The polymerization was carried to a point where the mixture became too viscous to stir. The polymer was dissolved in a mixture of xylene and methyl ethyl ketone to give a 78.8 percent by weight solution. A cadmium orange pigment was added to the solution in amount equal to the weight of the resin. 0.5 percent of the wetting agent sorbitan monooleate polyoxyethylene was added. The ingredients were thoroughly mixed and the resulting paint was applied to a smoke stack. The coating showed no signs of deterioration after 16 months at 300° F. to 340° F.

Example 3

Using the procedure of Example 1, a thermosetting copolymeric resin having the following composition was prepared. A mixture of 6.8 mols of phenylmethyldiethoxysilane and 1.7 mols of phenyltriethoxysilane was condensed with 8.98 mols of USP glycerine. After removal of the alcohol had been completed a mixture of 3.3 mols of phthalic anhydride and 0.4 mols of azelaic acid was added. The resin so obtained did not darken after heating for several days at 250° C.

Example 4

Two mols of phenyltriethoxysilane was condensed with 4 mols of trimethylene glycol and the product so obtained was reacted with 1 mol of maleic anhydride according to the procedure of Example 1. The resin obtained was a thermosetting material which when cured at 250° C. produced a hard, solvent-resistant, thermostable material.

Example 5

Phenylmethyldichlorosilane in amount of 2 mols was added over a period of 40 minutes with stirring to 2 mols of anhydrous glycerine. The temperature rose to 52° C. during the first part of the addition and then fell to 39° C. as HCl was evolved. The mixture was then heated with agitation until the temperature reached 130° C., whereupon the mixture began to foam. At this point one mol of phthalic anhydride was added and heating and agitation were continued for three hours. By the end of this time the reaction product was too viscous to allow further stirring. Accordingly it was dissolved in a mixture of xylene and methyl ethyl ketone and the solution so obtained was applied to copper wire. The solvent was evaporated and the adhering coat was heated up to 500° C. whereupon it set to a hard, thermostable film.

Example 6

8 mols of phenylmethyldiethoxysilane was added with agitation to 8 mols of glycerin, whereupon the ethoxyl to hydroxyl ratio is 0.67. About 10 grams of HCl was added to the mixture and the material was heated for 3 hours as the temperature was raised to 200° C. During this period 770 grams of ethyl alcohol distilled from the mixture. 4.92 mols of phthalic anhydride was then added and the material was stirred and heated for 3½ hours as the temperature was raised to 240° C. Heating at 240° C. was continued until the viscosity became so high that the mixture could no longer be agitated. The resulting mass was cooled and diluted with xylene and methyl ethyl ketone. The resulting resin solution was used to coat metal articles which were baked at elevated temperatures whereupon the resin film set to a hard, thermostable material.

Example 7

Two mols of phenylmethyldiethoxysilane was condensed with two mols of USP glycerin in the presence of 10 grams of HCl according to the procedure of Example 1. After removal of 160 grams of ethyl alcohol the material was further polymerized by the addition of 0.9 mols of tetrachlorophthalic anhydride. The material was heated with stirring for 2 hours as the temperature was raised to 245° C. A viscous, soluble mass was thereupon obtained. The resin set to a hard, insoluble material when further heated at 200° C.

Example 8

A mixture of 1.1 mols of phenylmethyldichlorosilane, 0.3 mols of phenyltrichlorosilane and 0.6 mols of methyltrichlorosilane was added slowly to 2.53 mols of anhydrous glycerin. During the addition of the chlorides the mixture was cooled to 4° C. 350 cc. of diisobutyl ketone was added and the solution was heated up to 190° C. whereupon the solvent and HCl were removed. One mol of phthalic anhydride was added to the residue which was then heated up to a temperature of 216° C. and agitated as carbon dioxide was passed through the mixture to aid in the removal of volatiles. After 2 hours the resin had become too viscous for proper agitation. It was thereupon diluted with xylene and methyl ethyl ketone. A clear homogeneous solution resulted. The resin so obtained when heated at elevated temperatures produces a hard, solvent-resistant, flexible material which is excellent for coating metallic objects.

Example 9

A mixture of 0.8 mols of phenylmethyldiethoxysilane and 0.6 mols of silicon tetrachloride was added slowly with stirring to 2 mols of anhydrous glycerin. Hydrogen chloride evolved slowly at room temperature and more rapidly as the temperature was raised to 89° C. After ½ hour 55 grams of ethyl alcohol had distilled off whereupon the viscosity had increased so that the mixture could not be stirred. 6 mols of phthalic anhydride was thereupon added and heating continued with refluxing at 164° to 169° C. for ½ hour. The viscosity of the mixture decreased initially after addition of the phthalic anhydride but soon began to increase again. The temperature was raised gradually to 208° C. over a period of less than one hour whereupon the viscosity again rose to a point where stirring was impossible. The reaction mass was diluted with 150 cc. of xylene and 500 cc of methyl ethyl ketone. The resulting solution was filtered whereupon a clear, homogeneous solution was obtained. This material when applied to the surfaces of base members and heated produces hard, thermostable, flexible films.

Example 10

This resin was prepared according to the procedure of Example 9. Two mols of phenyl silicon trichloride was added with stirring to 4 mols of propylene glycol. After removal of the HCl was complete one mol of phthalic anhydride was added and the resulting mixture was polymerized at temperatures up to 245° C. The resulting resin was a thermosetting material which was stable at temperatures up to 250° C.

Example 11

1.5 mols of diphenyldichlorosilane was added to one mol of 2,2 bishydroxymethyl-1,3 propanediol with agitation. The mixture was heated up to 250° C. with the evolution of HCl. 0.5 mols of phthalic anhydride was added and the heating and agitation continued for one hour at 272° C. whereupon the viscosity increase made further agitation impossible. The mass was then cooled and dissolved in a mixture of xylene and methyl ethyl ketone. Upon evaporation of the solvent a clear, thermosetting, hard, solvent-resistant resin is obtained.

Example 12

This resin was prepared in accordance with the procedure of Example 9. Two mols of phenyltrichlorosilane was condensed with 4 mols of propylene glycol whereupon one mol of succinic anhydride was added. The resin so obtained was heat hardened to an insoluble flexible material.

Example 13

The following resin was prepared in accordance with the procedure of Example 9. Two mols of phenyltrichlorosilane was condensed with 4 mols of propylene glycol and the resulting material was reacted with one mol of adipic acid. After one hour a clear, xylene-soluble resin was obtained. This resin would thermoset upon being heated at temperatures in the neighborhood of 200° C.

Example 14

A thermosetting resin was prepared according to the procedure of Example 9 by condensing one mol of diphenyldichlorosilane with 2 mols of anhydrous glycerin and then reacting the resulting condensate with 2 mols of phthalic anhydride.

Example 15

A thermosetting material was obtained, employing the procedure of Example 9, by condensing 4 mols of diphenyldichlorosilane with 3 mols of anhydrous glycerin and reacting the resulting product with ½ mol of phthalic anhydride.

Example 16

Three mols of dimethyldichlorosilane was added slowly with stirring to 4 mols of propylene glycol. The evolution of HCl began immediately and the temperature of the mixture was raised to 89° C. After ½ hour one mol of phthalic anhydride was added and the material was stirred and heated to 150° to 155° C. A soluble viscous resinous material was obtained.

Example 17

A mixture of 2.3 mols of glycerin and 0.4 mol of stearic acid was heated with agitation until no more water was evolved. To this mixture 2 mols of phenylmethyldiethoxysilane was added and the mixture was heated with stirring until 190 grams of ethyl alcohol was removed. 0.8 mol of phthalic anhydride was added and the temperature was raised gradually to 215° C. and the mixture was stirred until the viscosity became so great that stirring was impossible. The resulting clear, homogeneous resin was dissolved in xylene and the solution so obtained was used to coat metal articles. Upon heating the coated articles at 200° C. or above the resins thermoset to a flexible solvent-resistant material.

Example 18

When one mol of phenylmethyldichlorosilane is condensed with 2 mols of propylene glycol according to the procedure of Example 9 and the resulting condensate is reacted with 2 mols of trimellitic acid at a temperature up to 230° C. until the viscosity of the mixture reaches a point where agitation is impossible, a thermosetting resin is obtained.

Example 19

Two mols of phenylmethyldichlorosilane was run into 0.2 mol of hydrogenated ricinoleic triglyceride and the mixture was agitated and heated moderately. HCl was evolved. The reaction product was then added to 2.3 mols of glycerin. The mixture was agitated and heated at 110° C. as HCl was vigorously evolved. After heating the mass to 147° C. to remove all the HCl, phthalic anhydride was added in amount sufficient to react with all the remaining unesterified hydroxyl radicals. After 7 hours of heating at 144° C. to 223° C. a one-phase resin soluble in xylene resulted.

That which is claimed is:

1. A method of preparing organosilicon copolymers which comprise condensing a silane of the composition $R_nSiX_{4-n}$ in which R is selected from the group consisting of alkyl and monocyclic aryl radicals, $n$ has a value of from 0.9 to 2.1 and X is selected from the group consisting of halogen and alkoxy radicals, with a polyhydric alcohol having from 3 to 4 hydroxyl radicals per molecule in amount such that the ratio of silane X radicals to alcoholic hydroxyl radicals is from 0.33 to 0.88 and reacting the product so obtained with a compound selected from the group consisting of polycarboxylic acids having from 2 to 3 carboxyl radicals per molecule and anhydrides thereof in amount such that the ratio of the number of acid functional groups to the sum of the number of alcoholic hydroxyl radicals plus the silane X radicals is from 0.06 to 1.2

2. The product prepared by the method of claim 1.

3. The method in accordance with claim 1 wherein R is an alkyl radical.

4. The method in accordance with claim 1 wherein R is a monocyclic aryl radical.

5. The method of preparing thermosetting organosilicon copolymers from a silane, a polyhydric alcohol having from 3 to 4 hydroxyl radicals per molecule and an acidic compound selected from the group consisting of polycarboxylic acids having from 2 to 3 carboxyl radicals per molecule and anhydrides thereof, at least one of the group the silane, the alcohol and the acidic compound being at least trifunctional, said silane being of the composition $R_nSiX_{4-n}$ in which R is selected from the group consisting of alkyl and monocyclic aryl radicals, $n$ has a value from 0.9 to 2.1 and X is selected from the group consisting of halogen and alkoxy, which method comprises condensing the silane with the alcohol in amount such that the ratio of the silane X radicals to alcoholic hydroxyl radicals is from 0.33 to 0.88 and reacting the product so obtained with the acidic compound in amount such that the ratio of the number of acid functional groups to the sum of the number of alcoholic hydroxyl radicals plus the silane X radicals is from 0.06 to 1.2.

6. The product prepared in accordance with claim 5.

7. The method in accordance with claim 5 in which R is an alkyl radical.

8. The method in accordance with claim 5 in which R is a monocyclic aryl radical.

MELVIN J. HUNTER.
LAWRENCE A. RAUNER.

REFERENCES CITED

The following references are of record in the file of this patent:

UNITED STATES PATENTS

| Number | Name | Date |
|---|---|---|
| 2,395,550 | Iler et al. | Feb. 26, 1946 |
| 2,441,066 | Hanford | May 4, 1948 |
| 2,500,843 | MacKenzie et al. | Mar. 14, 1950 |
| 2,529,956 | Myles et al. | Nov. 14, 1950 |

FOREIGN PATENTS

| Number | Country | Date |
|---|---|---|
| 583,754 | Great Britain | Dec. 30, 1946 |

OTHER REFERENCES

Krieble et al., Journ. Americ. Chem. Soc., vol. 64, Nov. 1947, pp. 2689 to 2692.